April 15, 1952     E. R. BURTNETT     2,592,538
POWER-TRANSMITTING MECHANISM
Filed June 17, 1946                                  3 Sheets-Sheet 1
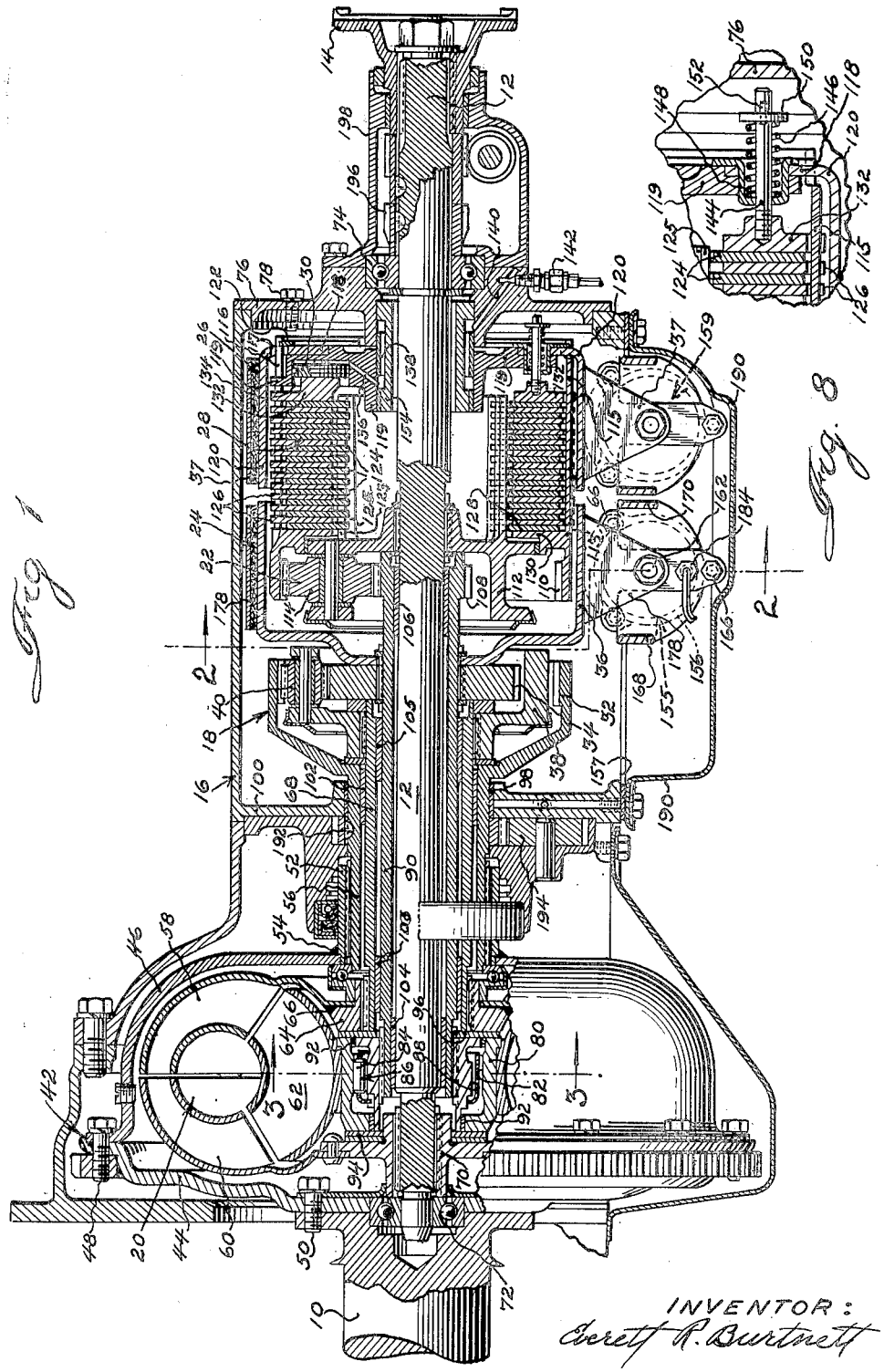
INVENTOR:
Everett R. Burtnett April 15, 1952  E. R. BURTNETT  2,592,538
POWER-TRANSMITTING MECHANISM
Filed June 17, 1946  3 Sheets-Sheet 2
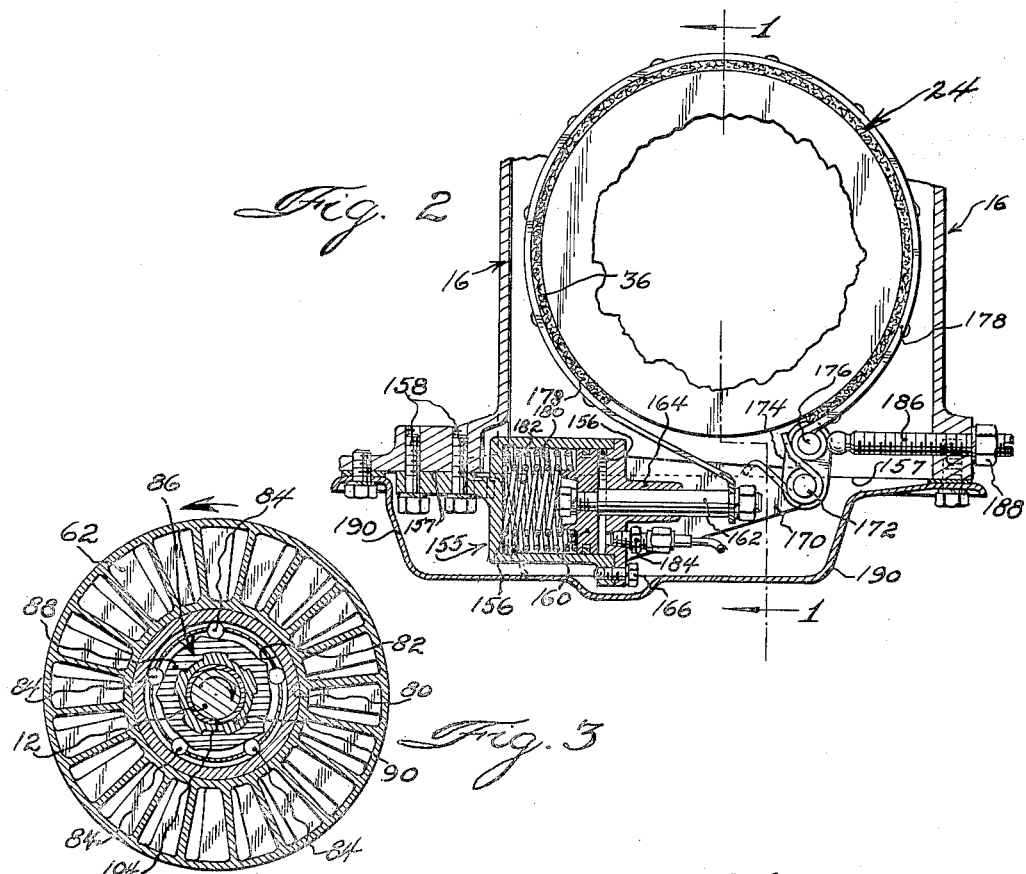
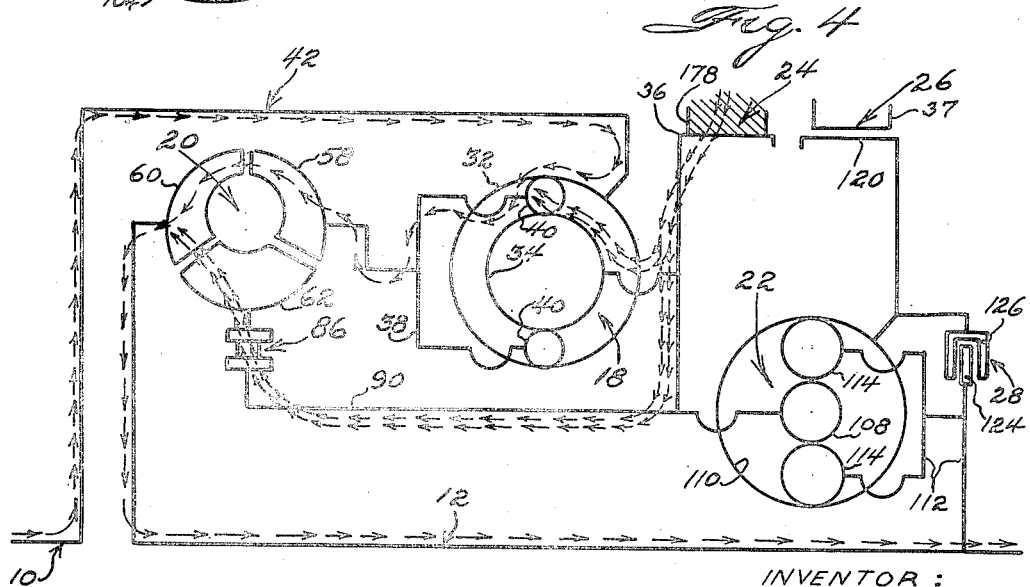
INVENTOR:
Everett R. Burtnett INVENTOR:
Everett R. Burtnett Patented Apr. 15, 1952

2,592,538

UNITED STATES PATENT OFFICE 2,592,538

POWER-TRANSMITTING MECHANISM

Everett R. Burtnett, Inglewood, Calif., assignor to Borg-Warner Corporation, Chicago, Ill., a corporation of Illinois Application June 17, 1946, Serial No. 677,292

17 Claims. (Cl. 74—677)

This invention relates to gearing arrangements combined with coupling means for establishing and sustaining the transmission of power in which combination particular benefits derive from continuous forward drive between an input and an output shaft from a high torque initial drive to a relatively lower torque drive.

The invention relates more particularly to forms of mechanical type torque converter drive transmitting arrangements combined with hydrodynamic coupling devices in which combination particular benefits derive from dividing torque between parallel drive transmitting torque paths effective for the divided torque values jointly to urge the propelling of the load in certain of a sequence of forward driving speed ratio ranges.

An object of the invention is to provide a power transmitting mechanism having simplified forms of gearing in combination with a hydrodynamic coupling device and adapted to provide an infinitely variable range of low forward speed ratios, a substantially constant intermediate speed ratio, and a fixed high speed ratio.

Another object of the invention is to provide such mechanism embodying planetary or epicyclic gearing and a hydrodynamic coupling device providing a plurality of different forward speed ratios and arranged to prevent drag torque of the hydrodynamic coupling device during engine idling, to yield only a low drag torque during engine idling and establishment of low forward or reverse speed ratio, and a high fluid drive efficiency in high speed ratio, the arrangement of the gearing and hydrodynamic device being such that there is no speed reduction between the hydrodynamic device and the input shaft during engine idling and establishment of the starting low speed ratio to amplify a drag of the device tending to urge the vehicle to creep.

Another object of the invention is to provide a power transmitting mechanism embodying planetary or epicyclic gear sets and a hydrodynamic torque converting device, the hydrodynamic device and one of the planetary gear sets being arranged in parallel and connected directly between the output shaft and the other planetary gear set receiving power from the input shaft, to provide two torque paths between the shafts, one of which paths is utilized to provide an infinitely variable range of low forward speed ratios and a substantially constant intermediate speed ratio, and both of which paths are utilized to provide a high speed ratio and reverse drive, the described arrangement having the advantage of providing for the simultaneous drive connection of the gear sets through the medium of the torque paths while simultaneously the gear sets are operative in the conversion of torque.

A further object of the invention is to provide such mechanism as described wherein the hydrodynamic coupling device is of the torque converter type and is directly connected to and between the planetary gear set receiving power from the input shaft, and to the output shaft in such manner that in the neutral condition of the mechanism during transmission of power from the gear set to the pump element of the device, the rotation of the latter is braked by the stationary turbine element of the device and its connected load shaft and fully expended through the gear set receiving power from the input shaft so that drag torque of the device inducing the vehicle to creep is avoided.

Another object is to provide a hydrodynamic coupling and epicyclic gearing drive mechanism arranged so that the working fluid circuit of the coupling shall directly couple the load shaft to the reaction element of an epicyclic gear unit to establish and sustain reversing gear drive therein when the mechanism is set for reverse drive.

Another object of the invention is to provide a power transmitting mechanism comprising a hydrodynamic coupling and input and output epicyclic gear sets in which reverse gear drive is provided as a differential ratio of the sets, the hydrodynamic coupling functioning to establish and sustain reversing drive in the input gear set, with advantages in reduced torque holding requirement on the part of the fluid drive couple to establish and sustain the reversing gear drive.

A further object is to provide a drive mechanism of forms of combination comprising a hydrodynamic power transmission unit, adapted to function either as a torque converter or fluid coupling, and multiplex gearing comprising an epicyclic gear set, coupled to the engine and transmitting power to the hydrodynamic unit, which is controllable to selectively multiply the torque in unidirectional transmission therethrough for propelling the load via the hydrodynamic unit or to propel the load through a torque multiplying gear train of the multiplex gearing connected to the hydrodynamic unit.

Another object is to provide a slipping coupling and multiplex gearing drive mechanism embodying a control arrangement and operative to condition a gear set of the multiplex gearing to provide a speed ratio and to simultaneously condition a train of connections whereby another of the multiplex gear sets is coupled between the driving and driven shafts of the mechanism in such manner that the slipping coupling will function to establish and sustain drive through the other gear set. An advantage of this combination is that, in acting to complete the driving connections, the slipping coupling is required to deliver only a portion of the torque input to the gear set in series with which it is associated.

Another object is to provide a variable forward speed and torque, and reverse, drive hydrodynamic and gearing meechanism, in which in selection for obtaining a range of speeds, the input torque can be divided, one portion of the input torque being hydraulically reversely imparted to a vaned reaction member of a fluid torque converter, constituting the hydrodynamic component of the mechanism, and the remaining portion of the input torque being reversely imparted to a gear train of the gearing of the mechanism; the reversed divided torques being recombined in another train of connections and being multiplied before delivery to a load shaft.

Another object is to provide a fluid torque converter and epicyclic gearing drive mechanism in which, respectively, the driven turbine runner of the fluid torque converter and the vaned reaction member of the same converter are drivingly connected with each other to a common load shaft. Also, in this mechanism, the path for the torque of the vaned reaction member to reach the load shaft includes in series therewith a speed reducing gear train operative to transmit and convert the torque of the vaned reaction member before delivery to the load shaft. This feature is advantageous in retrieving torque imparted to the vaned reaction member by the operating fluid circuit to supplement the drive via the driven turbine runner to a common load shaft.

A further object of the invention is to provide a hydrodynamic power transmission unit of the reaction type adapted to function either as a torque converter or a fluid coupling combined with multiplex epicyclic gear units of forms of combination and arrangements with the hydrodynamic unit such that a given revolvable member shall serve as a reaction abutment shaft for the reaction member of the hydrodynamic transmission unit, as the reaction member for a first epicyclic gearing group and as the primary driving element of a second epicyclic gearing group, for deriving the benefits of simplicity in overall construction and in ratio actuation means in the obtaining of plural speed ratios for connecting an input and an output shaft.

A further object of the invention resides in the provision of a drive mechanism adapted for dividing the torque and for resolving the divided torque values jointly for the driving continuity of either a reverse drive or a direct forward drive adapted for interconnecting an input and an output shaft arranged in end-to-end relation.

Other objects of the invention will appear from the following description taken in connection with the drawings which form a part of this specification, in which:

Figure 1 is a vertical sectional view through drive mechanism incorporating the present invention.

Figure 2 is a fragmentary cross-sectional view taken along the line 2—2 of Figure 1 showing one of the brake control devices.

Figure 3 is a fragmentary cross-sectional view taken along the line 3—3 of Figure 1 showing the one-way coupling device connecting the fluid torque converter reaction member with the tubular abutment shaft or sleeve.

Figure 5:
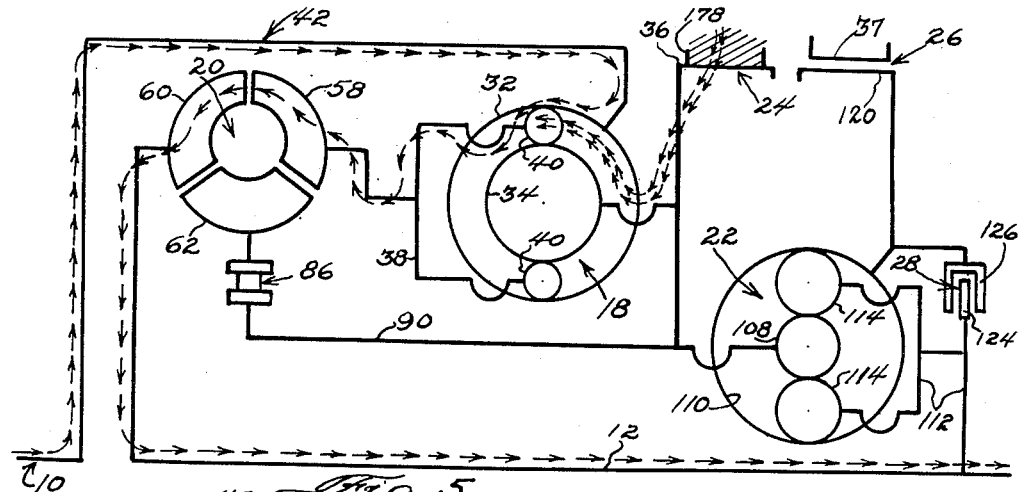
Figure 6:
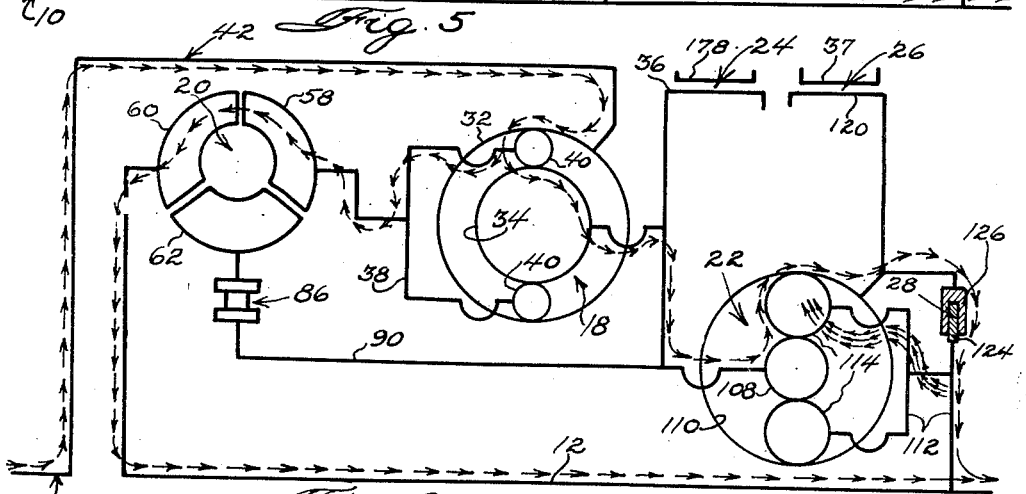

Figures 4, 5, 6, and 7 are schematic representations of the power transmitting system illustrated in Figure 1 conditioned for operation during low forward speed, intermediate forward speed, direct drive, and reverse drive, respectively.

Figure 8 is an enlarged fragmentary longitudinal view showing the construction and detail of a suitable form and arrangement of the retractor springs for the clutch 28.

With reference now to the drawings, a variable speed and torque power transmitting system constructed in accordance with the present invention has been illustrated in conjunction with an automotive vehicle. It includes a driving or input shaft 10 and a driven, or load shaft 12, the former of which is driven from the vehicle engine shankshaft and the latter of which may be operatively coupled to the propeller shaft of the vehicle through a universal joint, a part 14 of which is illustrated splined to the output shaft 12 and beyond which the propeller shaft is in turn connected to the driving wheels of the vehicle through suitable means.

The system of the present invention is housed within a transmission case or gear box indicated as a whole by 16 and the top of which is relatively close to the transmission drive axis. The system includes only a relatively few elements, considering the range of performance obtained therefrom, and these are of simple construction, easily manufactured, assembled and controlled selectively to provide a plural forward driving speed sequence beginning with a bottom speeds range in which multiplication of the torque may be infinitely variable.

The system comprises in the main a primary torque multiplying epicyclic gear unit 18 for the forward drive, a compounding torque multiplying fluid torque converter 20 for the forward drive and a torque multiplying epicyclic gear unit 22 for the reversed drive. The gear units 18 and 22 will, therefore, be called the driving and reverse gear units, respectively.

The ratio selecting means, the actuation means for which is adapted to derive force externally for actuation, comprise a reaction braking unit 24 for the driving gear unit 18, a reaction braking unit 26 for the reverse gear unit 22, and a clutch unit 28 for the direct drive forward speed and associated primarily with the reverse gear unit 22.

The fluid turbine drive transmitting unit 20 is adapted to resolve itself from functioning as a torque converter to a fluid coupling accordingly as its turbine member or runner speed approaches that of its pump or impeller member. In the bottom speeds range of the available forward speeds sequence including either the operation yielding infinitely variable ratio multiplication of the torque or that of the substantially constant gear ratio which represents the intermediate speed, all of the torque shall be delivered through the turbine runner, and in either the high speed (direct drive) or reverse drive only a portion. In reverse drive the torque transmission required of the hydraulic couple between the pump and the turbine runner of the hydrodynamic unit will correspond to the ratio of the torque resistance of the load shaft 12 against rotating in a forward drive direction and required by the planet carrier of the gear unit 18 whereby it shall be reaction sustained to enforce rotation of the sun gear relative to that of the driving annulus gear, both of the same gear unit. Accordingly, in reverse drive the hydrodynamic unit 20 complements and is depended upon to couple one torque path of a circuit of connections in which reverse gear drive is obtained as a differential ratio of the multiple epicyclic gear units.

The epicyclic gear units 18 and 22 are selectively placed in operation by friction brakes 24 and 26, respectively, and the clutch 28 is actuatable into an engaged condition by a plurality of fluid pressure actuated pistons 30, only one of which is shown. According to one of the features of the present invention the brake and clutch units are so arranged and their individually associated actuation means are adapted to be so controlled that only one of them is in operation at a time for the variable forward driving speeds and the reverse drive. The brake unit 24 is adapted to be released for rendering the system "no drive" i. e., in neutral. The pair of brake units 24 and 26 in their related connection through the reverse gear unit 22 lend themselves to locking the driven shaft 12, and thereby the drive including the driving wheels of the vehicle, to the transmission case 16 and thus in positive reaction should they be simultaneously applied. Preferably the brake unit 24 is normally effective (engaged) while the other brake 26 and clutch 28 are normally non-effective (disengaged). The brake and clutch units may be suitably selectively operated, either manually or automatically in known manner, to provide the desired sequence of forward driving gear ratios and direct drive ratio and alternately to establish the reverse drive or the transmission in neutral, as will be described in greater detail shortly.

The driving epicyclic gear unit 18 includes an internal or annulus input gear 32, a reaction sun gear 34 to which a brake drum 36 is secured and a reduced speed forward drive output planet carrier 38 supporting rotatably thereon around their respective axes a system of planetary pinion gears 40 each in mesh with both the annulus and sun gears. The primary input gear 32 is directly connected to rotate with the input shaft 10 through a housing indicated as a whole by reference character 42 and comprised of parts 44 and 46 secured to each other by bolts 48. The part 44 is secured to the input shaft 10 by bolts 50, and the part 46 is secured to a hub 52 by a weld indicated by the reference character 54. The hub 52 is internally splined and engages corresponding splines in the periphery of the forward end of a tubular shaft portion 56 of the input gear 32 and secures the latter to rotate with the housing 42 and input shaft 10.

The hydrodynamic transmission unit 20 which is adapted to function either as a torque converter or as a fluid coupling includes a driving, or impeller element 58, a driven or runner element 60 and a vaned reaction element 62, all three of which may be of conventional construction. The impeller element 58 has a hub portion 64 welded thereto as indicated by the reference character 66 and which hub is internally splined and engages corresponding external splines on the forward end of a second tubular shaft 68 which in turn through another spline relationship is secured to rotate with the planet carrier 38 of the driving epicyclic gear unit 18. Accordingly, the impeller element is readily detachably secured to rotate with the driven planet carrier of the driving gear unit 18. The turbine element 60 is readily detachably secured to rotate with the output shaft 12 by means of a hub 70 riveted to the element 60 and internally splined for engaging corresponding external splines on the output shaft. The output shaft 12 is rotatably supported at its forward end by a bearing 72 arranged in a recess formed in the input shaft 10 and at a rearward intermediate point by a bearing 74 arranged in the rearward end wall 76 which is detachably secured to a corresponding open end of the transmission case by bolts 78. The reaction element 62 has a "pressed in" hub 80 the internal surface or bore of which forms a concentric annulus race 82 for roller clutch members 84 of a one-way coupling device indicated as a whole by the reference character 86. A member 88 which is formed with external cam lobes adapted to be engaged by the respective roller clutch members 84 is secured to a reaction abutment or third tubular shaft 90 through a splined relationship therewith and serves as the hub of the one-way coupling 86. Taken in the direction indicated by the arrows which intersect the line 3—3 of Figure 1, Figure 3 discloses that this one-way coupling device is adapted to lock in response to tendency on the part of the reaction member 62 to rotate retrograde relative to clockwise rotation of the input shaft 10, driven turbine element 60 and output shaft 12 which assures that when the abutment shaft 90 is held against retrograde rotation the reaction member 62 likewise will be restrained. It will be seen that this arrangement provides for the hydrodynamic transmission unit to function either as a torque converter or fluid coupling. In addition, the reaction member 62 is rotatably mounted on the reaction shaft 90 by plain type bearing bushings 92 and is further provided with thrust washers 94 and 96 engaging the hubs 64 and 70, respectively. Further, it will be seen that the four concentric and telescopically arranged first, second, and third tubular shafts 56, 68, 90 and the relatively innermost output shaft 12 are all mounted for rotation relative to each other. A plain type bearing 98 arranged in the forward end wall 100 of the transmission case 16 lends rigidity with respect to rotatably supporting the outer shaft 56; in turn a plain bushing 102 between the shafts 56 and 68 lends rigidity with respect to rotatably supporting the latter shaft; in turn plain bushings 103 and 105 between the shafts 68 and 90 lend rigidity with respect to rotatably supporting the latter shaft; and in turn plain bushings 104 and 106 between the shafts 90 and 12 lend rigidity with respect to mounting the shaft 12 for rotation.

The reverse gear unit 22 includes a driving sun pinion 108 formed on the rearward end of the reaction shaft 90, an internal or annulus reaction gear 110 and an output planet carrier 112 connected through a splined relationship to rotate with the output shaft 12 and supporting for rotation around their own axes a set of planet pinions 114 each in mesh with the sun and annulus gears 108 and 110. A rearwardly extending cylindrical portion 113 of the annulus gear 110 is longitudinally slotted as indicated by the reference character 116. The resulting spaced lands or protrusions 115 of the extension 113 extend through openings 117 accommodating same and formed in an enclosure member 118 for the clutch 28. Member 118 has a drum portion 120 to be engaged by the reaction braking band 37 of the unit 26 which forms the ratio actuation unit for selection of the mechanism in reverse drive. Accordingly, the annulus gear 110 is sesured against rotation relative to the drum 120. A snap ring 122 is fitted into an accommodating internal groove formed in the ends of the protrusions 115 and prevents longitudinal movement of the annulus gear 110 and the drum 120 relative to each other and at the same time renders the assembly or disassembly easy. A clutch hub portion 125 extends rearwardly from the planet carrier 112. This portion 125 is also longitudinally slotted as indicated by the reference character 123 and a set of clutch disks 124 each internally correspondingly slotted are fitted to rotate with and are carried on this clutch hub extension 125 of the carrier 112. A set of alternately disposed mate clutch disks 126 are externally slotted and are fitted to the slotted extension 113 of the annulus gear 110, thus rotating with the latter. A pressure resisting clutch face 128 is formed facing rearwardly on a flange portion 130 of the extension portion 113 of the annulus gear 110, and a presser clutch plate 132 is arranged at the opposite end of and facing the assembly of clutch disks. The pressure member 132 also is externally slotted and fitted to the slotted extension 113 of the annulus gear 110 so as to be rotatable therewith. A hub part 119 of the clutch enclosure member 118 is also externally slotted and fitted to rotate with the extension 113 of the annulus gear 110. Cylinders 134 are bored in the part 119 and accommodate the respective pistons 30 so that the admission of fluid pressure to the cylinder clearance space behind the respective pistons through ducts 136, 138, and 140, the latter communicating with a fluid pressure supply fitting 142, will operate to energize the presser plate 132 to move from a retracted (clutch disengaged) position to the left and thus actuate the assembly of clutch disks into an effective clutch engaged condition. For automatic retraction of the clutch presser plate 132 (reference being had more particularly to Figure 8) a set of bolts 144, threaded into accommodating apertures formed in the presser plate 132 and springs 146, compressed between the bottom of a set of cups 148 secured to the assembly of the clutch enclosure member 118 and drum 120 together with a washer 150 fitted over the respective bolts and "backed up" by a thrust sustaining key 152 inserted through the bolt, effects a constant but yielding urge upon the presser plate 132 to move retractively to the right, thus automatically to accomplish disengagement of the clutch upon release of the fluid pressure from behind the pistons 30. Accordingly, clutch 28 is normally disengaged. The duct 138 is preferably an annular communication between the ducts 136 and 140 formed in the section of a bushing 154 which is shown pressed into a recess provided therefor in the end member 76 of the transmission case, thus providing that the intercommunicating passage or duct 138 will be stationary with the supply duct 140 and supply fitting 142. The stationary bushing 154 forms a spindle supporting the hub portion 119 of the clutch assembly.

The brake operating or actuating means for the driving gear unit 18 and for the reverse gear unit 22, as a whole are indicated by the reference character 155 and the reference character 159, respectively, and may take various forms. For instance, the one illustrated in Figure 2 shows a cylinder 156 detachably secured to the faced-under-side opening 157 in the transmission case 16 by bolts 158, and a piston 160 arranged reciprocally within the cylinder, with a rod 162 secured to the piston and extending through a guide member 164 which is detachably secured to the cylinder by bolts 166 and which guide member, also forming an enclosing head for the open end of the cylinder, has an integral pair of bracket arms 168 and 170 (the spaced relationship of these arms being clearly illustrated in Figure 1 in section as taken along the irregular line 1—1 of Figure 2). A pin 172 is fitted in apertures provided therefor in the arms 168 and 170 and which pin accommodates for rock motion thereon a link member 174 which in turn carries a second pin 176 to which a brake band 178 for the brake unit 24 for gripping engagement around the reaction drum 36 of the driving epicyclic gear unit 18 is anchored. The other end of this band is secured to the outside end of the piston rod 162, and a set of springs 180 and 182 are arranged and compressed between the base head of the cylinder 156 and the piston 160, thus effective to normally but yieldingly energize the brake 24 for normally establishing the driving epicyclic gear unit 18 for reduced speed gear and multiplication of the torque of the input shaft 10 to drive the hydrodynamic (fluid torque converter) unit 20. Admission of fluid pressure into the clearance chamber between the piston 160 and the piston head member 164 through the fluid pressure supply fitting 184 is required to actuate the piston to the left against the tension of the springs 180 and 182 thereby to release the band 178 from gripping relation with the drum 36; whereas for the brake unit 26, associated with the reverse epicyclic gear unit 22, the actuating unit 159 (Figure 1) may be identical with that of the actuating unit 155 (Figure 2) except that the arrangement of the springs within the actuation cylinder and the clearance chamber for the fluid pressure for overruling the tension of the springs may be in reverse so that the springs, or spring, will operate normally to actuate the brake band 37 of the brake unit 26 for the reverse gear unit 22 released and requiring that fluid pressure be utilized for energizing application (engagement) of this brake band. An individual screw 186 threaded through an aperture provided therefor in the side of the transmission case 16 and each equipped with a locking nut 188 is provided for adjusting each of the brake bands 36 and 37 from outside the transmission case, and an oil pan 190 is detachably secured to the bottom of the transmission case 16 for easy access to the brake actuating units and to facilitate easy installation of the gearing into or its removal from the case 16.

The brake and clutch operating means may be supplied with fluid under pressure by suitable means, and the variations with respect to establishing and disestablishing the communications between the supply and the different actuating units may be by suitable means either for automatic or manual control, as desired. The fluid under pressure may be supplied, for instance, from either one or the other or from both driving and driven power transmission member driven pumps. In the illustrated case a driving pump (adapted to be driven as long as the engine is running) comprises a driving gear 192 keyed to the outer tubular shaft 56 which is connected permanently to rotate with the driving engine crankshaft 10 and a driven gear 194 in constant mesh with the gear 192. For a driven transmission member pump drive a gear 196 is keyed to the output or driven shaft 12 and to which gear a second pump (not shown) may be suitably related and secured to the tail case 198 which is detachably secured to the end member 76 of the main transmission case 16.

The operation of the system will be followed more easily in connection with more specific reference to the diagrammatic illustrations of Figures 4 to 7 inclusive, which illustrate the various torque or power flow paths under various conditions, during the different forward driving speeds and alternately the reverse drive. In each of these diagrammatic illustrations the single line of arrows indicates the torque flow representing the drive from the input shaft 10 to the output shaft 12, the double row line of arrows the reaction from the brake units to the reaction gears, or to the reaction member of the fluid torque converter, and the triple row line of arrows the path of a portion of the torque load resistance.

*Neutral or no-drive.*—The mechanism is so conditioned when the reaction braking bands 37 and 178 and the clutch unit 28 are all released. With the engine and driving annulus gear 32 rotating and as a result of the tendency of the carrier 38 and pump member 58 of the hydrodynamic unit 20 to rotate in the same direction, the resultant discharge of fluid from the pump 58, impinging the vanes of the turbine 60 and thus meeting the torque resistance of the latter and the load shaft 12, will act as a brake on the pump member 58 and carrier 38 and cause the sun gear 34 to be rotated reversely at whatever speed required fully to spend the speed of the engine and the annulus gear 32.

*Low forward speed range (Figure 4).*—Assuming that the brake unit 24 is engaged and the brake unit 26 and clutch 28 disengaged, the transmission will be set for initiating motion of the output shaft 12 at low speed high torque multiplication ratio when the input shaft 10 representing the engine is accelerated sufficiently above the engine idling speed. The input torque of the shaft 10 and annulus gear 32 combined with the reactance effect of the now held sun gear 34 will cause the planet pinions 40 therebetween to rotate the carrier 38 and driving turbine member 58 at primary multiplied torque value. In turn, the fluid circulated by the impeller 58, discharged therefrom and successively from the driven turbine member 60 for circulation through the curved vanes of the reaction member 62 will obtain compound multiplication of the torque, infinitely variable in ratio, in accordance with either reducing ratio of the load-torque resistance of the output shaft 12, or the speed of the driven turbine member gradually approaching that of the impeller 58. When the fluid discharged from the driven turbine member no longer tends to rotate the reaction member 62 reversely the one-way coupling 86 will permit the reaction member to overrun (freewheel) the held reaction shaft 90 in accordance with the turbine unit functioning as a fluid coupling.

*Intermediate forward speed gear ratio (Figure 5).*—As either the ratio of the load resistance of the shaft 12 relative to the value of the gear multiplied input torque to the turbine unit 20 reduces, or as the speed of the driven turbine member 60 approaches that of the impeller 58, or under conditions of the simultaneous occurrence of both such changing conditions, accordingly the fluid turbine unit changes from its maximum torque multiplication capacity to operation as a fluid coupling and will yield infinite reduction in rate multiplying of the torque until multiplication will continue to obtain solely in the gear unit 18. Thereafter the fixed torque multiplication gear will prevail as the intermediate forward speed ratio as long as the brake unit 24 is engaged, or until the ratio of the load-torque of the output shaft 12 relative to the torque of this gear multiplication rises sufficiently to reduce the speed of the driven turbine member relative to that of the impeller 58 effective again reversely to cause the reaction member 62 to back against the one-way coupling 86 for a resumption of the compounding torque multiplication in the fluid turbine unit.

*Direct drive (Figure 6).*—Since an engaged condition of the direct drive selector clutch unit 28 results in connecting the elements of the gear unit 22 and sun gear 34 of the gear unit 18 to rotate as a unit with the carrier 112 and output shaft 12 and turbine 60, should the shift to direct drive be effected when vehicle speed is sufficient, correspondingly the resultant common speed of rotation of the sun gear 34 and turbine 60 will be appreciable. Accordingly, whether or not simultaneously the engine is being fed through an appreciable throttle opening, whereby power rotation of the annulus gear 32 would also be appreciable, the resultant rotation of the planetary pinions 40 responsive to that of the sun gear 34 and in turn rotation of the carrier 38 and impeller 58 unidirectionally with that of the sun gear 34 and turbine 60, would be of corresponding speed. Resulting from the thus compounded rotation of the impeller 58 and turbine 60 a substantially solid fluid couple therebetween will connect the elements of the gear unit 18 and thereby the engine shaft 10 for unitary rotation with the remainder of the transmission which is locked for unitary rotation by the clutch unit 28. Therefore, when actuation for the shift to direct drive is effected when vehicle speed is sufficient, establishment and sustaining of direct drive by the turbine unit will be instantaneous with selection of the mechanism in direct drive by engagement of the clutch unit 28.

On the other hand, should selection of the mechanism in direct drive be effected while the vehicle is at or near a state of rest and correspondingly the turbine 60 and sun gear 34 are at or near a state of rest, sufficient acceleration of the engine and annulus gear 32, in turn to cause the planetary pinions 40 unidirectionally to track around the sun gear 34 and thus unidirectionally rotate the carrier 38 and impeller 58, will be required to secure a fluid couple between the impeller 58 and turbine 60 and thus establish and sustain direct drive between the shafts 10 and 12.

It will be seen that in establishing and sustaining direct drive the fluid coupling shall handle one portion of the input torque divided in the set of planetary pinions 40 between the two parallel torque paths of which the sun gear 34 constitutes the starting point of one path and the carrier 38 and impeller 58 constitute the starting point of the other path. It will be noted that engagement of the clutch 28 for direct drive connects the ring gear 110 and the planet gear carrier 112 so that all of the elements of the rear planetary gearing 22, including the sun gear 108, the carrier 112, the ring gear 110, and the planet gears 114 are locked together to rotate as a unit. The two sun gears 108 and 34 are furthermore fixed with respect to the same intermediate shaft 90, and the sun gear 34 thus rotates at a 1 to 1 speed ratio with the elements of the rear planetary gear set and therefore the driven shaft 12 of the transmission. Thus one portion of the torque proceeds directly from the sun gear 34 to the driven shaft 12 while the other portion of the torque proceeds from the planet gear carrier 38 through the shaft 68 and the fluid torque converter 20 to the transmission driven shaft 12.

*Reverse drive.*—The mechanism may be selectively made operative to reverse the torque taken from the input shaft 10 and annulus gear 32. The planetary pinions 40 of the driving gear unit 18 operate to rotate the sun gear 34 in the reverse direction, and the reverse rotation of the sun gear 34 is transmitted to the rear planetary gear set 22, by means of which the torque from the sun gear 108 is multiplied for delivery to the carrier 112 of this gear set and output shaft 12. This selection is made when the brake unit 24 and the clutch unit 28 are released and the brake unit 26 is applied. In consequence the annulus gear 110 is held against rotation, and any tendency of the member comprising the sun gear 34, shaft 90 and sun gear 108 to rotate in either direction unidirectionally shall be reduced between said member and the carrier 112, output shaft 12 and turbine 60 as a result of the planetary pinions 114 tending to track in the same direction in the held annulus gear 110.

Under these conditions and on the assumption that an appreciable load torque resistance prevails in the output member which comprises the carrier 112, turbine 60 and shaft 12, and that said member is at rest corresponding with the vehicle at a standstill, a static state of load torque resistance will also prevail at the sun gear 34 as well as at the turbine 60.

Accordingly, rotation of the annulus gear 32 under the influence of torque from the engine will be imparted to the planetary pinions 40 which upon meeting the resistance of the sun gear 34 against rotation retrograde will tend to track around the latter unidirectionally with respect to rotation of the annulus gear 32 and will rotate the carrier 38 and impeller 58 in the same direction but at reduced speed.

Figure 7:
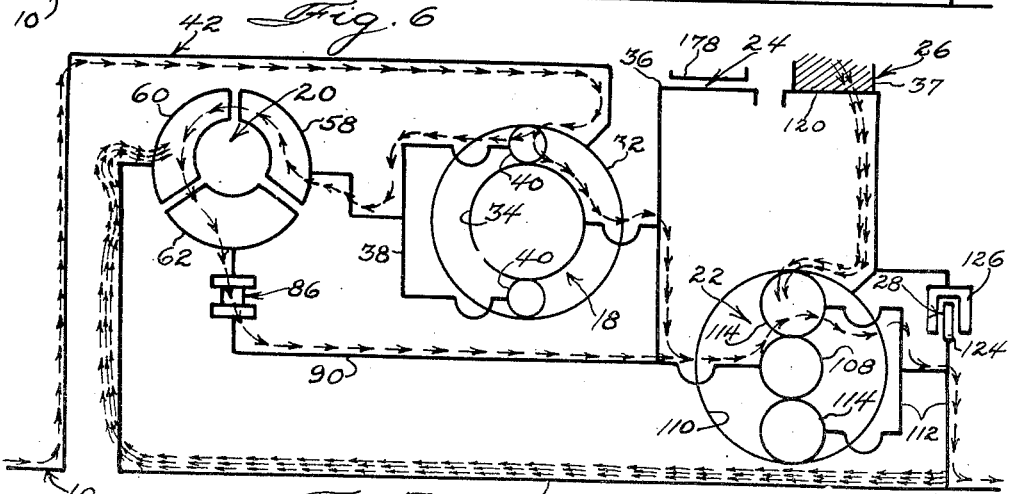

This rotation of the carrier 38, which is in the forward direction, that is, in the same direction as the direction of rotation of the drive shaft 10 will cause an increased coupling effect between the impeller 58 and runner 60 as the engine of the vehicle is accelerated and the shaft 10 increases its rotational speed. The turbine 60 is fixed to rotate with the driven shaft 12 of the transmission, and the resistance to rotation of the impeller 58 is thus increased due to fluid reaction from said member 60 on said member 58. The carrier 38 is fixed with respect to the impeller 58, and this resistance of the impeller to rotation is thus transmitted to the carrier, and the pinions 40 are then operated to transmit torque, in the reverse direction, to the sun gear 34. This torque on the sun gear 34 is transmitted to the sun gear 108 of the rear planetary gear set 22 which has its ring gear 110 held stationary by means of the brake 26. The torque on the sun gear 108 in the reverse direction is thus multiplied through the rear planetary gear set and the pinions 114 thereof tend to rotate the carrier 112 and the driven shaft 12 in the reverse direction. As the acceleration of the vehicle engine and the speed of the drive shaft 10 increase still further, actual reverse rotation of the driven shaft 12 will take place, and since the turbine 60 is fixed to the driven shaft 12, this will still further increase the coupling between the turbine 60 and impeller 58, providing a still greater resistance to rotation of the carrier 38, which in turn provides a resultant further increase in reverse torque transmitted to the sun gear 34 and to the driven shaft 12 through the rear planetary gear set 22. The front planetary gear set 18 thus has the effect of providing a reverse of its sun gear 34 which is connected through the rear planetary gear set 22 to the driven shaft, however the stator 62 also has a reverse driving effect, and as will be noted, the stator is connected through the shaft 90 with the two sun gears 34 and 108. As is well known, the reaction on the stator 62 of the torque converter is in the reverse direction and reverse drive is transmitted through the one-way coupling 86 and shaft 90 to the two sun gears, as is illustrated in Fig. 7 and the resultant torque on the sun gear 108 is the sum of the torque impressed on the sun gear 34 through the planet pinions 40 and the reverse torque on the reaction element 62. As is illustrated in Fig. 7, the input torque for reverse drive is divided in the planetary gear set 18, part of it proceeding through the sun gear 34 in the reverse direction and the other part proceeding from the carrier 38 through the shaft 68 and through the torque converter 20, wherein it is reversed and transmitted through the reaction element 62 to the intermediate shaft 90, by means of the one-way coupling 86, to the shaft 90 which acts to combine the reverse torque from both the sun gear 34 and the stator 63.

It will be seen that in each of the selective forward driving speed ranges, and in reverse, the drive is two-way effective, that is, effective for vehicle momentum to drive the engine as well as for the latter to drive the vehicle, but in any case completion of the driving connections through the transmission depends upon a developed fluid coupling effect through the torque converter 20.

The system may be established in neutral by a simultaneous disengaged condition of each of the brake units 24 and 26 and the clutch 28.

Thus it will be seen that I have provided forms of epicyclic gearing combined with vaned fluid wheels, input and output and other interconnecting power transmitting members, and ratio actuation and control means, the overall combination and arrangements of which form a variable forward speed and reverse drive mechanism.

Important aspects of the invention are: (1) the use of a hydrodynamic power transmission unit which is adapted in one drive selection of the mechanism at least to function either as a torque converter or a fluid coupling and to fluid torque couple a circuit of driving connections whereby a differential ratio of multiple gearing groups is secured; (2) the use of a torque converting gear train to complete driving connections and to provide a first torque path between the planetary pinions of an epicyclic gear unit and an output shaft for propelling the load, together with the use of a fluid turbine unit to complete driving connections and to provide a second torque path primarily between the same planetary pinions and the same output shaft, such that simultaneous torque at different speeds of rotation may be taken from the set of planetary pinions by the multi torque paths for delivery to the output shaft at still different speeds; (3) the use of a single unit of reaction braking means simultaneously to condition an epicyclic gear unit drivingly effective to connect the impeller of a hydrodynamic power transmission unit of the reaction type, which is adapted to function either as a torque converter or a fluid coupling, to be rotated from the engine and to establish anchorage to sustain the reaction member of the hydrodynamic unit via a train of reaction abutment connections in series therewith against retrograde rotation; (4) the use of plural units of reaction braking bands for selection to condition the mechanism for delivery of all the torque through the fluid torque couple which shall develop between the impeller and turbine runner of a hydrodynamic power transmission unit, or to condition the mechanism to split the torque for delivery of only a portion through the fluid torque couple; (5) the use of a unit of interengageable elements for selective actuation into an engaged condition to connect the elements of one epicyclic gearing group for unitary rotation thereby to condition the elements of a second epicyclic gearing group to be connected for substantially unitary rotation by the fluid torque couple which shall develop between two members of a fluid turbine unit; (6) the use of a gear train to multiply the torque of the vaned reaction member of a fluid torque converter before delivery to the final drive, which gear train is also used to transmit torque other than that of said reaction member to certain of plural drive connections between an input power and a load shaft; (7) the use of separate reaction braking units for selection to hold the sun pinion gear, or the annulus gear, of a given epicyclic gear train against rotation; (8) the use of two selectively operable reaction braking units, one braking unit being operative to simultaneously hold the sun gears of two epicyclic gear trains against rotation, and the other braking unit being operative to hold the annulus gear of one of the two epicyclic gear trains; (9) the use of a plurality of series compounded epicyclic gear units to provide a first torque path connecting, and multiplying torque between, an input and an output shaft, while a fluid torque couple by a hydrodynamic power transmission unit, which is also adapted to function as a torque converter between the same shafts, shall establish a second torque path connecting the shafts.

The above description is believed to set forth clearly the achieving of the various stated objects of the invention and to describe the advantageous results to be derived therefrom.

It will be understood that the accompanying illustration is given as an example and that the structure may be considerably modified both as to the particular arrangement therein shown and as to the gear ratios, or as to their number, and that one skilled in the art may make either substitutions for or supplement the elements of my invention without departing from the spirit thereof, as indicated by the scope of the appended claims.

I claim:

1. In a power transmitting mechanism, in combination, a driving member, a driven member, means providing a torque path between said members including a gear fixed to said driving member, a second gear, a set of planetary gears in mesh with both the aforesaid gears, a rotatable carrier for said planetary gears, a third gear adapted as an input gear for a second planetary gear set, said third gear being directly driven from said second gear, a revolvable fourth gear, a second set of planetary gears, said second set of planetary gears in mesh with both said third and fourth gears, a carrier for said second set of planetary gears, said second carrier drivingly related to said driven member, means operative to drive couple said first-named carrier with said driven member, means for restraining said second gear from rotation for thereby completing a power train from said driving member through said first named set of planetary gears and said carrier therefor to said driven member, and means for alternately restraining said fourth gear for thereby providing a power train in parallel with the first power train from said driving member through said second and third gears and said second set of planetary gears and said carrier therefor to said driven member.

2. In a power transmission system, in combination, a driving structure, a driven structure, an epicyclic gear train having a sun gear, a ring gear, a set of planetary gears in mesh with both said sun and ring gears, and a carrier supporting said planetary gears rotatable thereon, said carrier fixed to a member of said driven structure, selectively engageable means for holding said ring gear against rotation, a sleeve shaft fixed to said sun gear, and a fluid torque converter having an impeller wheel connected to be rotated from said driving shaft, a driven turbine wheel fixed to said driven shaft and a vaned reaction wheel connected directly to urge rotation of said sleeve shaft and sun gear in a retrograde direction relative to the direction of rotation of said driving structure, impeller and driven turbine wheels.

3. In a power transmission system the combination including a drive shaft; a driven shaft; a first ring gear adapted to be rotated from said drive shaft; a first sun gear; a first set of planet gears, said planet gears being in mesh with both said ring and sun gears; a first carrier, said first carrier supporting said planet gears thereon, each to rotate around its own axis; a second sun gear related permanently to rotate with said first sun gear; a second ring gear; a second set of planet gears, said second set of planet gears being in mesh with both said second sun and ring gears; a second carrier, said second carrier supporting said second set of planet gears thereon, each to rotate around its own axis; said second carrier being connected with said driven shaft, a hydrodynamic coupling device connecting said first carrier to said driven shaft, a brake for said first sun gear for completing a low speed forward drive power train from said drive shaft through said first set of planet gears and through said hydrodynamic coupling to said driven shaft; a brake for said second ring gear for completing a reverse drive power train from said drive shaft through said first set of planet gears, first ring gear, second sun gear, second set of planet gears, and second carrier to said driven shaft with said hydrodynamic coupling acting to brake rotation of said first planet gear carrier for rendering said first planet gear carrier the reaction member, and a clutch for connecting said second carrier with said second ring gear for locking said second set of planet gears to rotate as a unit with said second sun and ring gears for providing a substantially direct drive which proceeds through both the hydrodynamic coupling and said second gear set in parallel.

4. In a power transmitting mechanism, a driving shaft, a driven shaft, two relatively rotatable intermediate shafts operatively connected to said driving shaft, a slipping coupling including driving and driven members, said driving member being rotatable with one of said two intermediate shafts and said driven member being rotatable with said driven shaft to provide a torque path between said one intermediate shaft and said driven shaft, torque multiplying means connecting the other of said two intermediate shafts and said driven shaft and providing a torque path in parallel with the torque path provided by said first intermediate shaft and said slipping coupling, and means operated by said driving shaft and tending to rotate said two intermediate shafts in opposite directions.

5. In a power transmitting mechanism, the combination including an input power shaft; first and second relatively rotatable power transmitting members; an epicyclic gear unit connecting said input shaft, said first member and said second member for rotation relative to each other, an output shaft, means for connecting said first member with said output shaft including a torque converter device, and means operative either as a drive reducing device or direct drive coupling for drive connecting said second member and said output shaft.

6. In a power transmitting mechanism, a driving shaft, a driven shaft, two relatively rotatable intermediate shafts, gearing driven by said driving shaft and operatively connected with said intermediate shafts so as to tend to rotate said intermediate shafts in opposite directions, means providing a torque path between one of said intermediate shafts and said driven shaft and multiplying the torque of said intermediate shaft before delivery to said driven shaft, and means providing a torque path between said second intermediate shaft and said driven shaft, and converting the torque of said intermediate shaft to a higher value before delivery to said driven shaft.

7. In a power transmitting mechanism, the combination including an input first shaft; an output second shaft; means including a set of planetary pinion gears drivingly connected to said input shaft; third and fourth shafts drivingly connected to said planetary pinions for rotation relative to each other; means providing a torque path connecting said second and third shafts; a speed reducing epicyclic gear unit comprising an input element drivingly connected to and rotatable with said fourth shaft, an output element rotatable with said second shaft, and a rotatable element for said epicyclic gear unit; and means for holding said reaction element against rotation.

8. In a power transmitting mechanism, the combination including an input first shaft; an output second shaft; relatively rotatable third and fourth shafts; planetary gearing drive interconnecting said first, third and fourth shafts for imparting rotative effort of said first shaft simultaneously to said third and fourth shafts and permitting relative rotation of all three said shafts; means for imparting the rotative effort of said third shaft to said second shaft; planetary gearing including a sun gear rotatable with said fourth shaft, an annulus gear member, planetary pinions interconnecting said sun gear and said annulus gear member, a carrier member rotatably mounting said planetary pinions, one of said members being rotatable with said second shaft; and means for holding the other of said members against rotation.

9. In a power transmitting mechanism, the combination including an input first shaft; an output second shaft; intermediate third and fourth shafts; means including planetary gears effective simultaneously to rotate said third and fourth shafts from said first shaft and permitting relative rotation of said first, third and fourth shafts; a hydrodynamic coupling device comprising a driving member rotatable with said third shaft, a driven member rotatable with said second shaft, and a reaction member; a one-way coupling connecting said reaction member and said fourth shaft; means for holding said fourth shaft against rotation; planetary gearing including a revolvable reaction member, and planetary pinions drivingly connected to said fourth shaft and effective to simultaneously rotate said second-mentioned reaction member and said second shaft, and braking means for selectively holding either said fourth shaft or said second-mentioned reaction member against rotation.

10. In a power transmitting mechanism, in combination, a planetary gear set including an input power annulus gear, a sun gear, a carrier supporting planetary pinions interconnecting said annulus and sun gears; a second planetary gear set including a sun gear rotatable with the sun gear of said first-mentioned gear set, an annulus gear, a carrier supporting planetary pinions interconnecting said sun and annulus gears; means for releasably holding the sun gear of said first-mentioned gear set against rotation; means for releasably holding the annulus gear of said second gear set against rotation; means for releasably connecting the sun gear, the annulus gear and the planetary pinions of said second gear set to rotate as a unit with the carrier of said second gear set; a hydraulic torque converter including an impeller rotatable with the carrier of said first-mentioned set, a turbine rotatable with the carrier of said second gear set, and a revolvable vaned reaction member disposed so as to receive the fluid discharged from said turbine, and a one-way coupling having a coupling element rotatable with said vaned reaction member and another coupling element rotatable with both of said sun gears.

11. In a power transmitting mechanism, the combination including an input power shaft; a load shaft; a fluid torque converter including an impeller, a turbine disposed so as to receive the fluid discharged from said impeller, and a vaned reaction member disposed so as to receive the fluid discharged from said turbine, said turbine being drivingly connected to said load shaft for rotation in unison therewith; an epicyclic gear unit having an input element, a reaction element, an output element and planetary pinions interconnecting said input, output and reaction elements, said output element being drivingly connected to said output shaft, means for releasably holding said reaction element against rotation, means drivingly connecting said vaned reaction member to said input element, and means operatively connecting said impeller to said input shaft.

12. In torque multiplying drive system, in combination, a driving shaft, a driven shaft, means providing a first torque path connecting said shafts, said means including in series therein first and second drivingly interconnected epicyclic gear units each having rotatable input, output, reaction and planetary pinion members, the input member of said first unit being driven directly by said driving shaft and through the pinion members of said first unit rotating the other members of said first unit, said driven shaft rotating with the output member of said second unit, a fluid torque converter of the reaction member type coupling one of said other members of said first unit with said driven shaft, means providing a one-way coupling torque path between the reaction member of the fluid torque converter and the input member of said second gear unit providing for the latter to multiply the torque of the reaction member of the fluid torque converter when the reaction member of said second gear unit is held, and braking means for the reaction members of said gear units.

13. In a power transmitting system, the combination including a driving shaft, a driven shaft, two relatively rotatable intermediate shafts, a fluid torque converter of the reaction type coupling the first intermediate shaft with the driven shaft, a one-way coupling connecting the reaction member of the converter directly with the second intermediate shaft, a differential gear unit coupling said driving shaft, said first intermediate shaft, and said second intermediate shaft, a gear train connecting said second intermediate shaft with said driven shaft, means for conditioning said gear train to render the same operative to multiply the torque received from said second intermediate shaft and to transmit the multiplied torque to the driven shaft, the input member of said gear train being driven by and rotating with said second intermediate shaft.

14. In a power transmitting mechanism, the combination including a drive shaft, a driven shaft, epicyclic gearing driven directly by the drive shaft and comprising two relatively rotatable elements connected through planetary pinions for simultaneous rotation by the drive shaft, a gear train drivingly connecting one of said two relatively rotatable elements to said driven shaft, means including a hydrodynamic coupling device connecting the other of said relatively rotatable elements to said driven shaft, said hydrodynamic coupling device being of the torque converter type having a rotatable reaction member and a one-way coupling connected in series to said one relatively rotatable element to prevent rotation thereof and thereby render said one-way coupling effective to restrain rotation of said reaction member.

15. In a power transmitting mechanism, the combination including an input shaft, a load shaft, an epicyclic gear unit, said gear unit comprising an input element, planetary pinions and two relatively rotatable driven elements, means connecting said input element with said input shaft, said pinions interconnecting said input element and said two driven elements, a hydrodynamic coupling device directly connecting one of said driven elements with said load shaft and a portion thereof functioning as a means for restraining rotation of said one driven element from rotation in the same direction as said input shaft is driven, whereby the said one driven element may constitute a reaction element of the epicyclic gear unit and cause the other of said driven elements to rotate in a direction reverse to the direction of rotation of said input shaft, and means for connecting said other driven element with said load shaft and incluing a torque multiplying gearing.

16. In torque multiplying drive systems, in combination, a driving shaft for rotation from a prime mover, first and second epicyclic gear units each having rotatable input, output, reaction, and planetary pinion members, the input member of said first unit being directly driven by said driving shaft, a load shaft rotating with the output member of said second unit, a hydrodynamic coupling connecting the output member of said first unit with said load shaft, a brake for the reaction element of said first unit for completing a forward drive power train through said first unit and through said hydrodynamic coupling device to said load shaft, said reaction member of said first unit being connected with said input member of said second unit, and a brake for the reaction member of said second unit for completing a reverse drive power train between said driving shaft and said load shaft, said hydrodynamic device for reverse drive transmitting load resistance from said load shaft to said output member of said first unit whereby the reaction member of said first unit rotates reversely and a drive therefrom is transmitted through said second unit to said load shaft.

17. In a power transmitting mechanism, an input power shaft, an output shaft; a hydrodynamic coupling device including driving, driven, and reaction members, said driven member also operating as a reaction element of said coupling during certain operating conditions of said mechanism; an epicyclic gearing group having input, reaction and output elements, said output element being connected to said output shaft; said driven member of the hydrodynamic device when operating as the reaction member being connected to said input element; and means driven by said input shaft drivingly connected to said input element and to said driving member and operative to rotate simultaneously said input element and said driving member.

EVERETT R. BURTNETT.

REFERENCES CITED

The following references are of record in the file of this patent:

UNITED STATES PATENTS

| Number | Name | Date |
|---|---|---|
| 2,298,648 | Russell | Oct. 13, 1942 |
| 2,301,451 | Pollard | Nov. 10, 1942 |
| 2,308,547 | Schneider | Jan. 19, 1943 |
| 2,317,498 | Tipton | Apr. 27, 1943 |
| 2,324,713 | McFarland | July 20, 1943 |
| 2,351,213 | James | June 13, 1944 |
| 2,377,696 | Kelley | June 5, 1945 |
| 2,407,289 | La Brie | Sept. 10, 1946 |
| 2,414,359 | Carnagua | Jan. 14, 1947 |
| 2,456,328 | Schneider | Dec. 14, 1948 |